United States Patent [19]

Itoh

[11] Patent Number: 4,582,974

[45] Date of Patent: Apr. 15, 1986

[54] ELECTRIC DISCHARGE MACHINE INCLUDING MEANS FOR DETECTING ABNORMAL DISCHARGE CONDITIONS

[75] Inventor: Tetsuroh Itoh, Aichi, Japan

[73] Assignee: Mitsubishi Denki Kabushiki Kaisha, Tokyo, Japan

[21] Appl. No.: 519,643

[22] Filed: Aug. 2, 1983

[30] Foreign Application Priority Data

| Aug. 2, 1982 | [JP] | Japan | 57-134924 |
| Aug. 26, 1982 | [JP] | Japan | 57-148176 |
| Sep. 3, 1982 | [JP] | Japan | 57-153510 |
| Sep. 3, 1982 | [JP] | Japan | 57-153511 |
| Sep. 3, 1982 | [JP] | Japan | 57-153512 |
| Sep. 3, 1982 | [JP] | Japan | 57-153513 |

[51] Int. Cl.$^4$ .................................. B23H 1/02
[52] U.S. Cl. .................. 219/69 C; 219/69 G; 219/69 P; 219/69 S
[58] Field of Search ............. 219/69 C, 69 G, 69 M, 219/69 R, 69 P, 69 S

[56] References Cited

U.S. PATENT DOCUMENTS

| 3,654,420 | 4/1972 | Saito et al. | 219/69 S |
| 3,662,143 | 5/1972 | Davis | 219/69 G |
| 3,746,930 | 7/1973 | Van Best et al. | 219/69 S |
| 3,778,579 | 12/1973 | Takarada | 219/69 C |
| 3,809,848 | 5/1974 | Bell, Jr. | 219/69 P |
| 3,916,138 | 10/1975 | Pfau | 219/69 C |
| 4,009,361 | 2/1977 | Stanton et al. | 219/69 C |
| 4,163,887 | 8/1979 | Bühler | 219/69 P |
| 4,296,302 | 10/1981 | Bell, Jr. et al. | 219/69 G |
| 4,306,136 | 12/1981 | Delpretti | 219/69 C |
| 4,322,595 | 3/1982 | Fowell et al. | 219/69 C |
| 4,338,504 | 7/1982 | Gray | 219/69 M |
| 4,339,650 | 7/1982 | Tanaka et al. | 219/69 G |
| 4,346,278 | 8/1982 | Bhattacharyya et al. | 219/69 M |
| 4,348,573 | 9/1982 | El-Menshawy et al. | 219/69 M |
| 4,395,612 | 7/1983 | Izumiya | 219/69 C |
| 4,443,680 | 4/1984 | El-Menshawy et al. | 219/69 C |
| 4,450,337 | 5/1984 | Inoue | 219/69 G |

FOREIGN PATENT DOCUMENTS

| 636475 | 2/1962 | Canada | 219/69 P |
| 2454475 | 5/1976 | Fed. Rep. of Germany | 219/69 C |
| 2757646 | 6/1979 | Fed. Rep. of Germany | 219/69 G |
| 125934 | 9/1980 | Japan | 219/69 C |
| 152527 | 11/1981 | Japan | 219/69 G |
| 152536 | 11/1981 | Japan | 219/69 M |
| 81-02127 | 8/1981 | PCT Int'l Appl. | 219/69 G |
| 1388301 | 3/1975 | United Kingdom | 219/69 C |
| 1494992 | 12/1977 | United Kingdom | 219/69 P |

*Primary Examiner*—C. L. Albritton
*Assistant Examiner*—Geoffrey S. Evans
*Attorney, Agent, or Firm*—Sughrue, Mion, Zinn, Macpeak and Seas

[57] ABSTRACT

In an electric discharge machine including an electrode and a workpiece installed opposite each other with an insulating working liquid filling the gap therebetween and which is used to machine the workpiece by causing an electric discharge across the gap, two components of the frequency spectrum of the voltage waveform of the electric discharge across the electrode and the workpiece are analyzed to distinguish between normal and abnormal discharge conditions. The device includes elements for determining the conditions in the gap and which generate a signal according to the conditions of the interpole gap, based on the results of this analysis. When an abnormal condition exists, the size of the interpole gap may be changed, and the quiescent time between application of pulse voltages may be altered. Also, depending on the degree of abnormality, different quantities of dielectric fluid may be pumped through the interpole gap to remove accumulated impurities.

19 Claims, 11 Drawing Figures

ELECTRIC DISCHARGE MACHINE INCLUDING MEANS FOR DETECTING ABNORMAL DISCHARGE CONDITIONS

BACKGROUND OF THE INVENTION

This invention relates to an electric discharge machine, and more particularly to an electric discharge machine formed of an electrode and a workpiece installed opposite each other with an insulating working liquid filling the gap therebetween, and used to machine the workpiece by causing an electric discharge across the gap.

FIG. 1 is a schematic structural view of a conventional electric discharge machine. In FIG. 1, an electrode 10 is installed opposite to a workpiece 14 in processing tank 12 through an insulating working liquid 16. A power supply 18 for machining purposes is connected across the electrode 10 and the workpiece 14. The power supply 18 comprises a d.c. power supply 18a, a switching element 18b for interrupting the machining current, a current limiting resistor 18c, and an oscillator 18d for controlling the interrupting operation of the switching element 18b, and is used to supply current intermittently to the gap 20 between the electrode 10 and the workpiece 14.

The aforementioned current I is expressed by $I=(E-Vg)/R$ (where E=voltage of the d.c. power supply 18a, R=resistance of the current limiting resistor 18c, and Vg=interpole voltage). The interpole voltage Vg ranges from 20 to 30 V during the arc discharge and becomes 0 V during short-circuiting, E V in the absence of electric discharge, and 0 V when the switching element 18b is in an OFF state.

Consequently, if the interpole voltage Vg is detected and averaged in a smoothing circuit 22, this value may be used to control the interpole gap; that is, the mean voltage Vs is high when electric discharge is not readily caused when the interpole gap 20 is wide. When the interpole gap 20 is narrow, the mean voltage Vs is lowered because of short-circuiting or readily caused electric discharge. Accordingly, it is possible to control the feeding position of the electrode 10 so as to make the interpole gap 20 roughly constant by means of an oil hydraulic servo mechanism comprising an oil hydraulic pump 28 and an oil hydraulic cylinder 30, if the difference between the mean voltage Vs and a reference voltage Vr is amplified by an amplifier 24 and inputted to an oil hydraulic servo-coil 26.

The most common method of distinguishing between good and bad machining conditions in the conventional electric discharge machine is by observing the mean voltage Vs of the interpole voltage Vg. In other words, when the mean voltage Vs is low, the interpole impedance is also low; this causes short-circuiting and continuous arc discharge. The occurrence of short-circuiting and continuous arc discharge is due to the presence of chips as well as sludge in the interpole gap 20. However, the most dangerous abnormal arc discharge during electric discharge machining is such that once the short-circuiting or continuous arc discharge occurs, carbon is generated by thermal decomposition of the working liquid, and as a result, the electric discharge occurs across the carbon and the workpiece, whereby interpole impedance is increased. That is, despite the fact that the interpole gap is actually narrow, the gap may be judged as wide and normal machining may not be carried out. For this reason, there is a disadvantage in that it is impossible to detect a deteriorated condition in the interpole gap because of an abnormal arc discharge by only observing the mean voltage Vs.

SUMMARY OF THE INVENTION

An object of the present invention is to provide, in light of the aforementioned problems, an electric discharge machine capable of determining whether an interpole gap is in a normal or abnormal condition, by analyzing the frequency spectrum of the voltage waveform of the electric discharge across the interpole gap when the electric discharge is caused, in order to distinguish between normal and abnormal electric discharges.

A further object of the present invention is to provide an electric discharge machine wherein elements which may worsen the condition of the interpole gap, such as sludge and chips, are removed by first analyzing the frequency spectrum of the voltage waveform of the electric discharge across the interpole gap when electric discharge is caused in order to distinguish between normal and abnormal electric discharges, and increasing and decreasing the gap between the electrode and workpiece to generate a liquid flow by means of a pumping action in the interpole gap.

Another object of the present invention is to provide an electric discharge machine wherein the value of a pulse voltage applied across the gap between the electrode and the workpiece to normalize conditions in the interpole gap is controlled by analyzing the frequency spectrum of the voltage waveform of an electric discharge across the interpole gap when electric discharge is caused, in order to distinguish between normal and abnormal electric discharges.

Still another object of the present invention is to provide an electric discharge machine wherein the quiescent time of the pulse voltage applied across the gap between the electrode and the workpiece is controlled by analyzing the frequency spectrum of the voltage waveform of the electric discharge across the interpole gap when electric discharge is caused, in order to distinguish between normal and abnormal electric discharges and to normalize the conditions in the interpole gap.

Still another object of the present invention is to provide an electric discharge machine wherein a reference voltage used to control the gap between the electrode and the workpiece is controlled by analyzing the frequency spectrum of the voltage waveform of the electric discharge across the interpole gap when electric discharge is caused in order to distinguish between normal and abnormal discharges and to normalize conditions in the interpole gap.

An additional object of the present invention is to provide an electric discharge machine wherein the quantity of working liquid supplied to the gap is controlled by analyzing the frequency spectrum of the voltage waveform of the electric discharge across the interpole gap when electric discharge is caused, in order to distinguish normal and abnormal electric discharges and to normalize the conditions in the interpole gap.

To attain the objects of the present invention, an electric discharge machine comprising an electrode and a workpiece installed opposite each other with an insulating working liquid filling the gap between them is provided with means for detecting abnormal electric discharge by analyzing the frequency spectrum of the voltage waveform of the electric discharge across the electrode and the workpiece to distinguish between normal and abnormal discharge conditions; and means for determining the conditions in the interpole gap and providing a signal according to the conditions in the interpole gap based on this analysis.

DETAILED DESCRIPTION OF THE PREFERRED EMBODIMENTS

Figure 2:
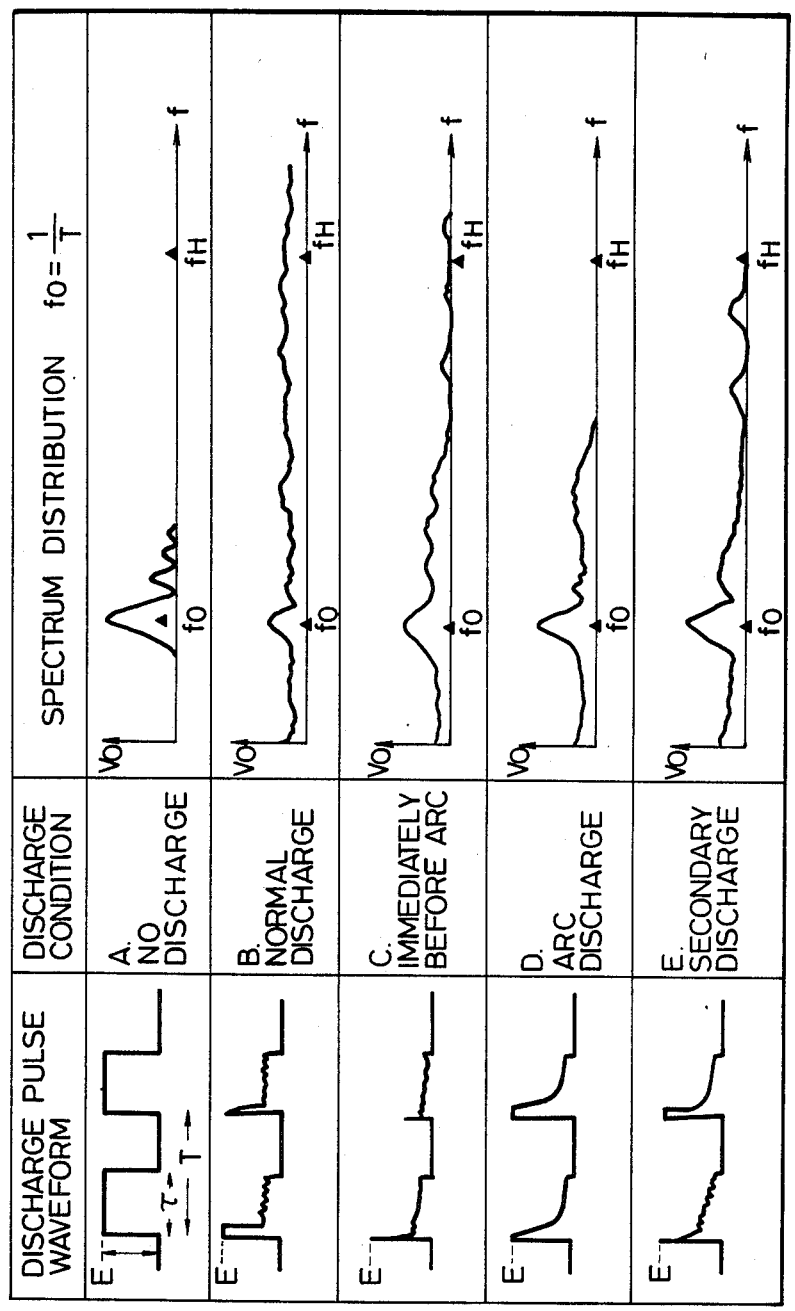
FIG. 2 is a diagram illustrating the principles according to the present invention.

Referring now to the drawings, a preferred embodiment of the present invention will be described. FIG. 2 shows discharge voltage waveforms illustrating the detection principle according to the present invention, and the frequency spectrums thereof. In the case of the application of a voltage pulse only without an electric discharge, the spectrum can readily be expressed by a numerical formula; for instance, the spectrum is given by $$f(t) = \frac{\tau}{T} E + \sum_{n=1}^{\infty} 2 \frac{\tau}{T} E \times \frac{\sin \frac{n\omega\tau}{2}}{\frac{n\omega\tau}{2}} \cdot \cos n\omega t.$$

where E=amplitude, T=period, $\tau$=pulse width and $\omega = 2\pi/T$. However, it is difficult to reduce the case where electric discharge takes place to an equation since the data change quite at random.

The spectrum chart in FIG. 2 refers to the case of $T = 2\tau$.

The spectrum distribution and discharge conditions make clear each of the following items:

(1) Irrespective of the spectrum, a very high output is exhibited at frequency fo, which is equivalent to the inverse of the period T. However, in comparison with other cases, the peak value is low in the case of normal electric discharge.

(2) In the case of an electric discharge relating to an arc, there exists almost no high frequency component $f_H$ (more than about 2 MHz), but there is developed a high frequency component without attenuation up to almost 200 MHz in the case of normal electric discharge.

(3) If the output is low at $f_o$ and sufficient at $f_H$, the electric discharge will be assumed normal.

The above described results make it clear that the discrimination of abnormal electric discharge will be possible if the state in (3) can be distinguished.

Figure 3:
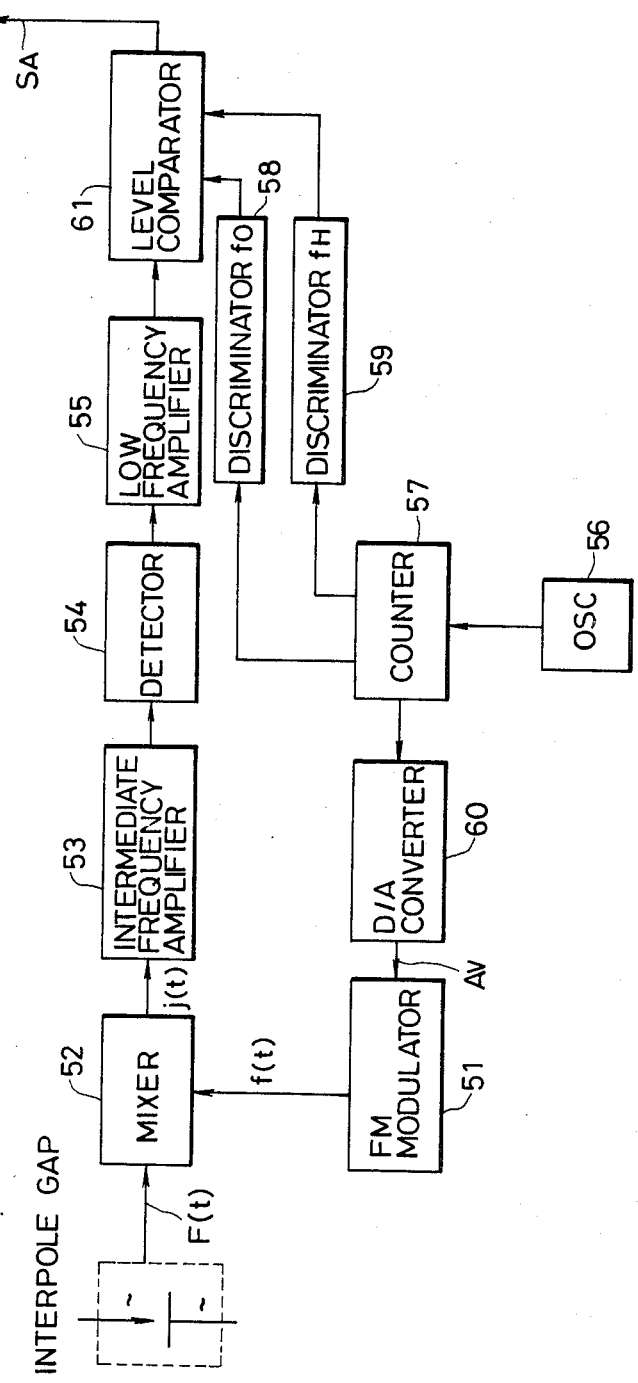
FIG. 3 is a diagram illustrating a circuit for frequency spectrum analysis.

FIG. 3 is a schematic diagram of an exemplary embodiment of the invention, and has basically the same construction as that of a spectrum analyser. The voltage signal F(t) in the interpole gap is mixed with an output signal f(t) of an FM modulator 51, and only an intermediate frequency j(t) is taken out of the sum of the frequencies F(t) and f(t), and the difference between them is also indicated through heterodyne detection. Subsequently, that frequency is amplified by an amplifier 53 for removing the intermediate frequency by means of a filter, whereas the amplified portion is detected by a detector 54 and amplified by a low frequency amplifier 55. Since the FM modulator has performed frequency modulation using an analog voltage Av, the relation between time and frequency becomes linearized by changing the analog voltage Av in proportion to time, so that the amplitude of the frequency spectrum larger by the frequency j(t) of the signal F(t) can be obtained as the output of the low frequency amplifier 55 on a time basis. Consequently, the time required for the analog voltage Av to become equivalent to the voltages at $f_o$, $f_H$ can be distinguished by an accurate oscillator 56 and a counter 57 for counting the output thereof. There are also shown an $f_o$ discriminator 58 and an $f_H$ discriminator 59. The contents of the counter 57 are converted into the analog voltage Av by a D/A converter 60 and are used to modulate the modulator 51. Responding to a timing signal applied by the $f_o$ discriminator or $f_H$ discriminator, a level comparator 61 determines whether the signal amplitude being subjected to low frequency amplification is larger or smaller than a reference value at predetermined timing, that is, whether the frequency spectrum is large or small, and, based on the results of this determination, generates an output SA when an abnormal electric discharge is caused. If the FM modulator 51 is such that it covers a wide band range of 5 MHz when input power is at 0 V and 10 MHz when it is at 10 V, and with D/A conversion of the 16-bit type, it is equivalent to a spectrum analyser having resolution of $\pm 80$ Hz. Moreover, because $f_o$ is changed each time the machining condition is selected, the operation, $f_o = 1/T$ (the period T is the sum of the ON and OFF times) must be controlled.

Referring to a detailed view of the level comparator 61 in FIG. 4, the above described output SA will be described in detail. The output of the low frequency amplifier 55 is arranged such that it is not connected to comparators 64, 65 by analog switches 62, 63 except at the timing for $f_o$ and $f_H$ discrimination. If the spectrum amplitude $V_o$ is greater than $V_1$ at the timing of $f_o$ discrimination, that is, if the amplitude at $f_o$ with respect to normal electric discharge is less than the actual value of $V_o$ at $f_o$ indicating an abnormality being initiated, the output of the comparator 64 will change to "1" and let a counter 67 carry out an accumulating operation through an AND gate 66. On the other hand, if $V_o$ is greater than $V_2$ at the timing of $f_H$ discrimination, that is, if $f_H$ exists at the time indicating normal electric discharge, the output of the comparator 65 will become "1" and reset the counter 67 through an AND gate 68. Consequently, the contents of the counter 67 increase when the spectrum amplitude is large at $f_o$ and becomes zero when $V_o$ is large at $f_H$. Since these operations are repeated, the quality of the condition in the interpole gap can be discriminated, if the contents of the counter are converted into an analog voltage $V_o$, using the D/A converter 40, and are observed. In other words, if $V_o$ becomes large, the situation is approaching an abnormal electric discharge, because, for instance, sludge is gathered in the interpole gap because chips remain therein, carbon is generated by the thermal decomposition of the working liquid 16 caused by an abnormal arc, or broken pieces of the electrode are present in the interpole gap 20. These operational problems are readily detectable.

However, the presence of this voltage $V_o$ for a short time cannot always be employed to judge the condition of the interpole gap to be abnormal because the conditions therein can change within a short time. Accordingly, whether or not the interpole gap is in a normal condition must be judged by detecting the fact that a value exceeding a prescribed output value of the digital-/analog converter 40 has continued for a certain period of time.

Figure 5:
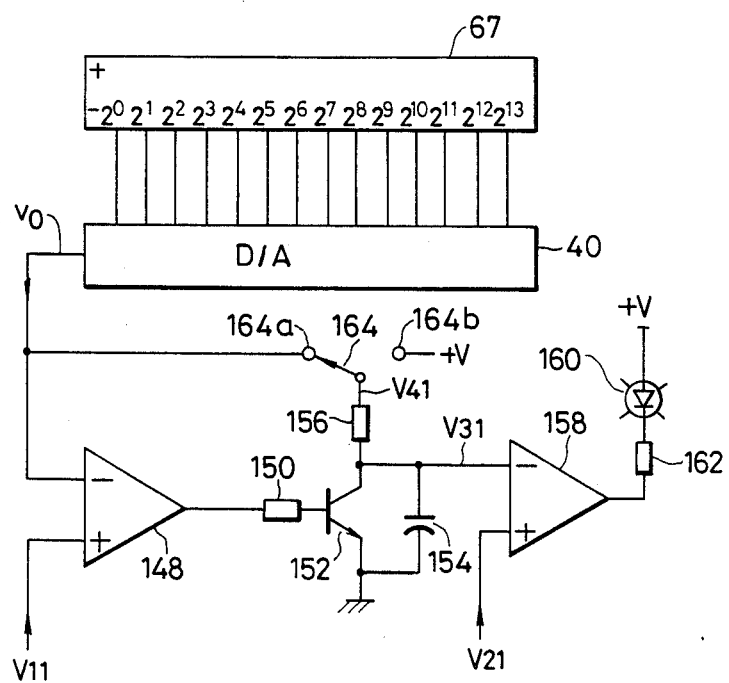
FIG. 5 is a display circuit diagram.

A voltage comparator 148 in FIG. 5 is used to determine whether the output $V_o$ of the digital/analog converter 40 is larger or smaller than a predetermined value V11. If $V_o > V11$, the output of the voltage comparator 148 will become negative, and turn on a switching transistor 152 through a base resistor 150. Thus, a capacitor 154 for time measurement is charged through a resistor 156, and the voltage V31 across the ends of the capacitor 154 is expressed by the following equation:

$$V31 = V41(1 - \exp(-t/r_2C))$$

where $r_2$ = resistance of the resistor 156; C = capacitance of the capacitor and t = time.

The voltage V31 of the capacitor 154 is compared with a reference voltage V21 by the voltage comparator 158. Since the output of the voltage comparator 158 does not become negative during the period when $V31 < V21$, an LED 160 will not light. When $V31 > V21$, i.e., after the condition $V_o > V11$ continues for a predetermined period of time, the output of the voltage comparator 158 becomes negative and indicates the occurrence of an abnormal condition in the interpole gap by lighting the LED 160 via a resistor 162.

A switch 164 is used to change the manner of determining the condition in the interpole gap from one using only a function of time (on the 164b side) to one dependent on the sum of the intensity and the time duration of the output, $V_o$ of the digital/analog converter 40. In other words, for machining wherein it is difficult to distinguish an abnormal condition in the interpole gap by merely detecting the elapsed time, for instance, in the machining of a sintered hard alloy subject to instantaneous cracking due to an arc or to the dropping of broken tungsten pieces, the occurrence of an abnormal condition in the interpole gap can be quickly detected as a function of the sum of the output $V_o$ and time of the digital/analog converter 40, if the switch 164 is turned to the contact point 164a. This is because, if the output $V_o$ is large, the current with which the capacitor 154 is charged will increase and the voltage V31 at the capacitor 154 will immediately reach the reference voltage V21.

In addition, it is clear that, by directly observing the voltage $V_o$, the difference between the most recent and actual values can be directly observed, and this can also be used to monitor the condition of the interpole gap.

Although a primary delay circuit comprising the capacitor 154 and the resistor 156 is used to measure the worsening condition in the interpole gap in the above described embodiment, it is also easy to measure the time by providing an accurate integrating circuit and an operational amplifier, to secure an accurate time measurement.

The embodiment of the present invention shown in FIGS. 2 through 5 makes it possible to accurately detect the quality of the condition of the interpole gap during electric discharge machining and, accordingly, to effectively prevent machining failure.

Figure 6:
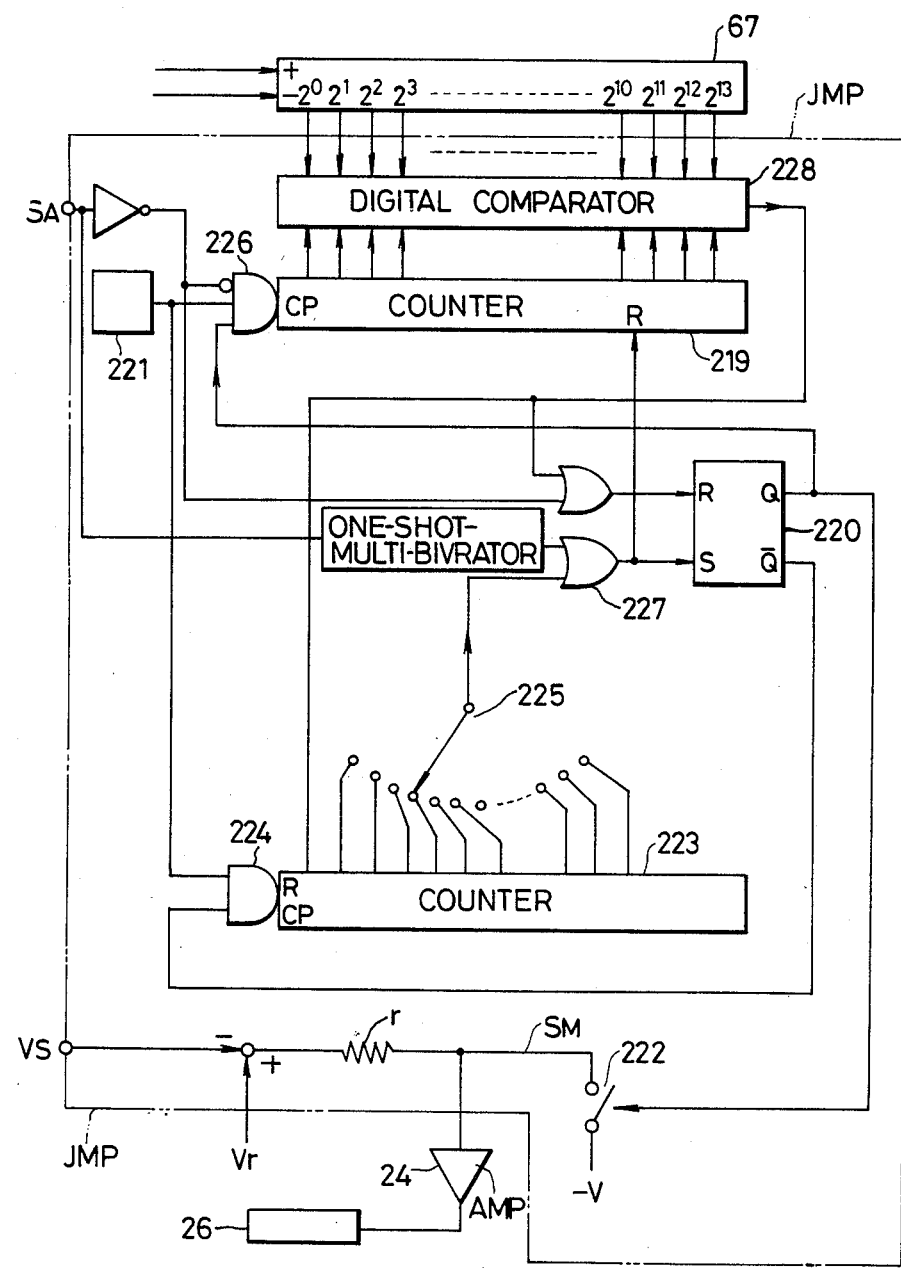
FIG. 6 is a forced jump circuit diagram for the electrode and workpiece according to the present invention.

As shown in FIG. 6, the output of the detector for detecting abnormal conditions in the interpole gap is sent to a control device (JMP) for controlling the condition of the interpole gap, together with a binary digital value, i.e., the output $2^0$-$2^n$ of the counter 67, and these signals are employed to force the interpole gap to be enlarged. The quantity of such enlargement is automatically controlled depending on the condition in the interpole gap.

FIG. 6 is a detailed view of the control device (JMP) for controlling the condition of the interpole gap, and, in this embodiment of the invention, the ratio of the quantity of the enlargement of the interpole gap and the machining time to the time required for the enlarging operation is controlled by controlling the time during which the signal used to forcibly enlarge the gap remains present.

In FIG. 6, when the abnormal detection signal SA is in the "1" state, an OR gate 227 is enabled through a one-shot-multivibrator to set the flip-flop 220 and to reset a counter 219, whereby the Q output of the flip-flop 220 becomes "1" and a counter 219 is reset. The signal "1" at the Q output of the flip-flop 220 is fed to both one of the inputs of the AND gate 226 and an analog switch 222. In response to the signal "1" from the Q output of the flip-flop 220, the switch 222 is closed, thereby causing the interpole gap servo-circuits 24 and 26 to receive a signal $S_M$ to raise the electrode.

To another input of the AND gate 226, the SA signal "1" is fed through an inverter. Hence, the clock pulses generated from a reference clock pulse generator 221 are fed to a CP terminal of the counter 219. The time set by the counter 219 is equal to the product of the period of the clock pulse of the pulse generator 221 and the count number of the counter 219.

A multidigit coincidence circuit 228 (digital comparator) detects the coincidence of the value of the counter 67 for detecting abnormalities with that of the counter 219. When such coincidence occurs, the R-S flip-flop 220 is reset and the signal "0" from the Q output terminal thereof is applied to the analog switch 222, thereby opening the latter and causing the lowering of the electrode.

The Q output of the flip-flop 220 remains at "1" only for a period of time corresponding to the value of the counter 67, and the electrode is forced to rise during this time. Moreover, the flip-flop 220 is reset by the output of the digital comparator 228 and thus the Q output becomes "0", whereupon the inverted output $\overline{Q}$ becomes "1". Consequently, a clock pulse input gate 224 of a counter 223 for determining the lowering time of the electrode is enabled to thereby permit the counter 223 to count the clock pulses from the clock generator 221, and upon the elapse of a preset time set by a switch 225, the flip-flop 220 is set through the OR gate 227. Concurrently, the content of the counter 219 is reset. As a result, the switch 222 is rendered open to thereby raise the electrode. Thus, the normal servo operation for the interpole gap is conducted on the basis of the difference between the interpole gap signal $V_s$ and the reference voltage $V_r$. During the period of time when the signal SA remains at "1", the switching operation of the analog switch 222 is repeated and thus a pumping action is achieved to generate a liquid flow in the interpole gap. A resistor r is used to protect the Vs and $V_r$ generating circuits when the signal SM for raising the electrode is provided.

The above operation is conducted only when the signal SA for detecting an abnormal condition in the interpole gap becomes "1", that is, when the gap is in an abnormal condition. The state of the detection signal SA is determined by the AND gate 226 and the OR gate 227 and, because the output of the OR gate 227 is "0" when the signal SA is at "0", the flip-flop 220 is kept in a reset state and the signal SM for raising the electrode is not output, whereby the normal servo operation for the interpole gap is conducted.

According to the example shown in FIG. 6, the interpole gap is automatically set depending on the abnormal machining condition when the signal SA for detecting an abnormal condition in the interpole gap becomes '1'. The greater the difference between the normal and abnormal conditions, the greater the time required for and the quantity of enlargement, so that the condition of the interpole gap may be improved. In addition, when the signal SA is '0', the electrode is not forcibly raised and the normal servo operation for controlling the interpole gap is conducted.

In the above embodiment of the present invention, although a description has been given with respect to a case in which the time of raising the electrode is controlled, the object of the present invention is to control the gap between the electrode and the workpiece in a manner such as to improve the conditions of the interpole gap based on the signal for detecting the abnormal condition. It is not technically difficult to control the period of time for machining, the raising speed, the period of elevation and machining, the servo reference voltage and gain in the servo system as in the case of controlling the time required for raising the electrode. By means of the invention, such control is readily carried out.

The continuous occurrence of an arc as the so-called failure of electric discharge is expected when electric discharges are concentrated at a point, and, in order to prevent such concentration, the most preferred method is to make it difficult for such an electric discharge to be generated.

Figure 7:
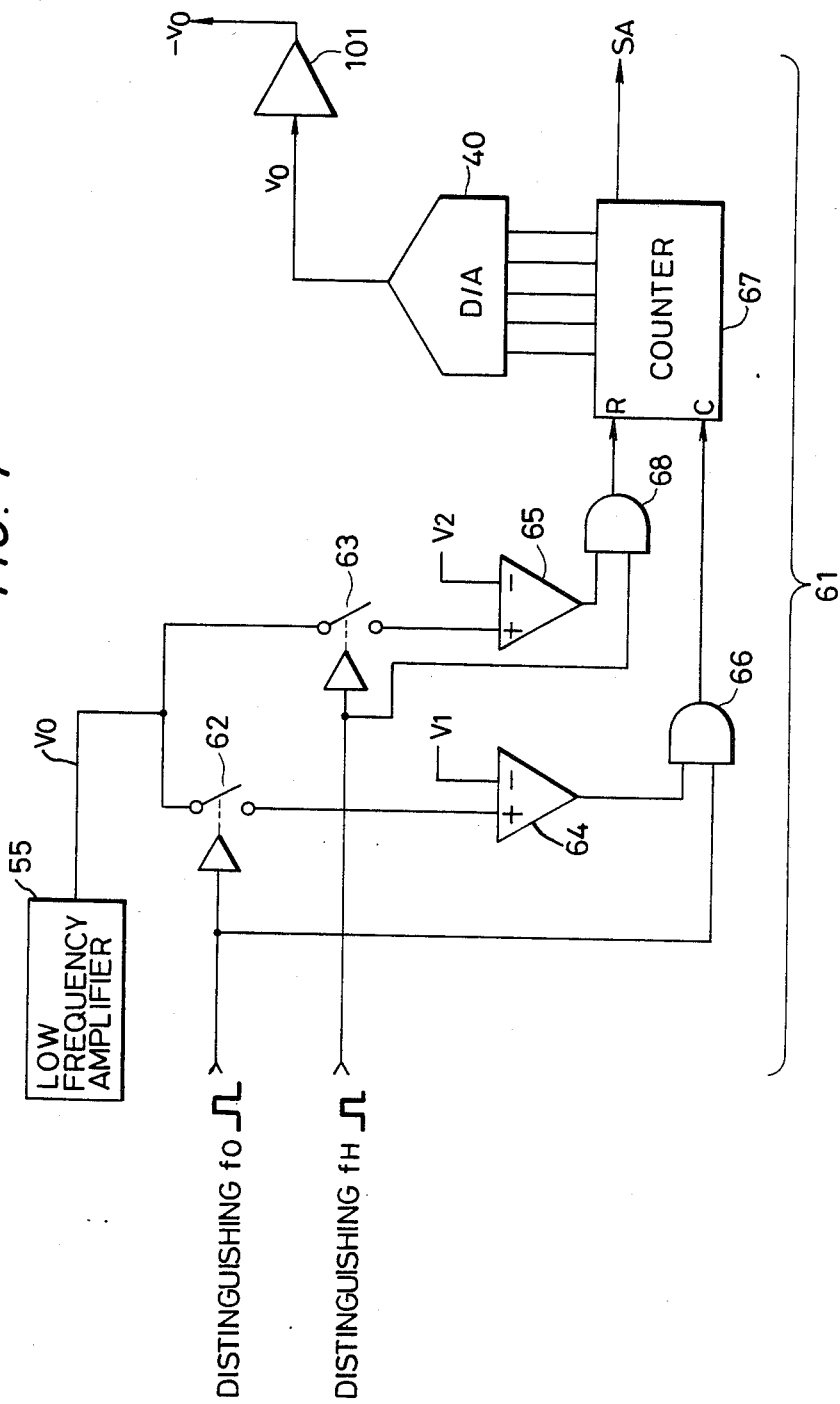
FIG. 7 is a diagram of a circuit for detecting and distinguishing an abnormal condition.

A description of a method of implementing the preferred embodiment of the present invention will now be given with reference to FIG. 7 et seq. FIG. 7 shows an inverting amplifier 101, wherein like reference characters designate like component parts in FIG. 4.

Figure 8:
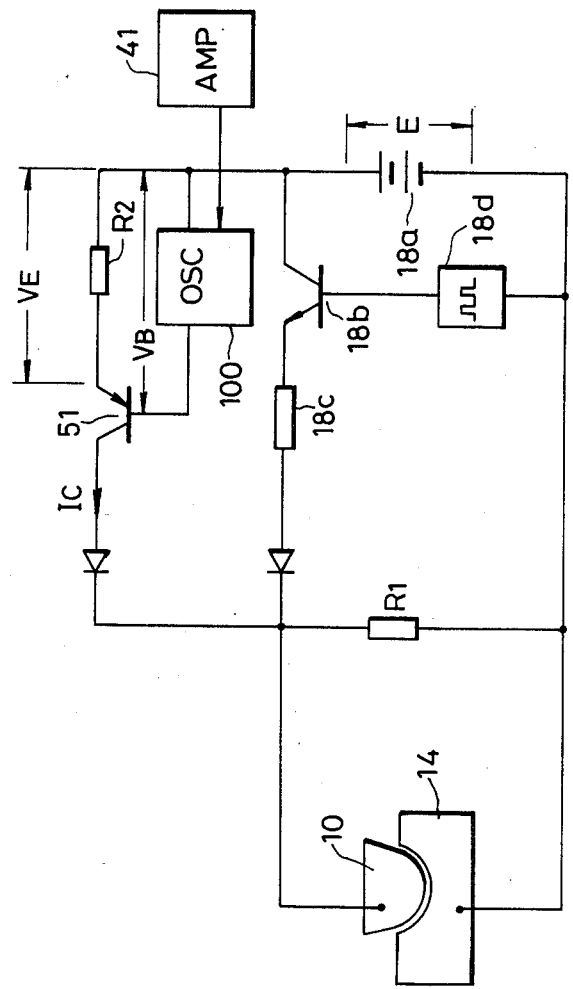
FIG. 8 is a diagram of a circuit for controlling the voltage applied across the interpole gap.

The device shown in FIG. 8 is used to change the voltage applied across the interpole gap based on the above output signal SA, and, if the voltage applied for commencing the electric discharge is lowered, electric discharge will scarcely be caused, particularly at one spot in the same discharge gap. Moreover, unless there is an electric discharge concentration, it is possible to easily conduct electric discharging in the same electric discharge gap by raising the voltage applied across the interpole gap.

The amplifier 41 in FIG. 8 is used to apply the analog voltage corresponding to the output of the counter 67 to an oscillator 100, which controls transistor 151, after amplifying the voltage. The voltage Vg applied to the interpole gap is expressed as follows.

$$Vg = -IcR_1 \quad (1)$$

Ic is almost nearly equal (about 99%) to the current flowing to the emitter follower load, $R_2$ of the transistor 51. Ic is given by:

$$Ic = VE/R_2 \approx VB/R_2 \quad (2)$$

(VE, VB are as shown in FIG. 8)
Therefore, from equations (1) and (2), $$Vg = (-R_1/R_2)VB \quad (3)$$

Assuming that $R_1 = 30$ K$\Omega$, $R_2 = 1$ K$\Omega$ and the supply voltage = 300 V, the change of VB from 0 to 10 V causes a change in the output voltage of the transistor 151 from 0 to $-300$ V. Thus, if the electric discharges are concentrated, the output of the inverting amplifier 101 will decrease as the contents of the counter 67 increase, whereby the interpole gap voltage Vg will decrease, thus preventing the concentration of electric discharges.

Although the voltage applied across the interpole gap is continuously changed according to the contents of the counter 67 in this example, it is not always necessary to make the contents of the counter proportional to the voltage. It has been confirmed through experiment that the transfer of the arc discharge is rather more effectively prevented by exponentially changing the voltage.

As shown by examples in FIGS. 7 and 8, there is realized a novel electric discharge machine, wherein an abnormal electric discharge is detected from the frequency spectrum of the discharge voltage waveform and, in addition, the value of the pulse voltage applied across the interpole gap is controlled to make the electric discharge condition normal.

Figure 1:
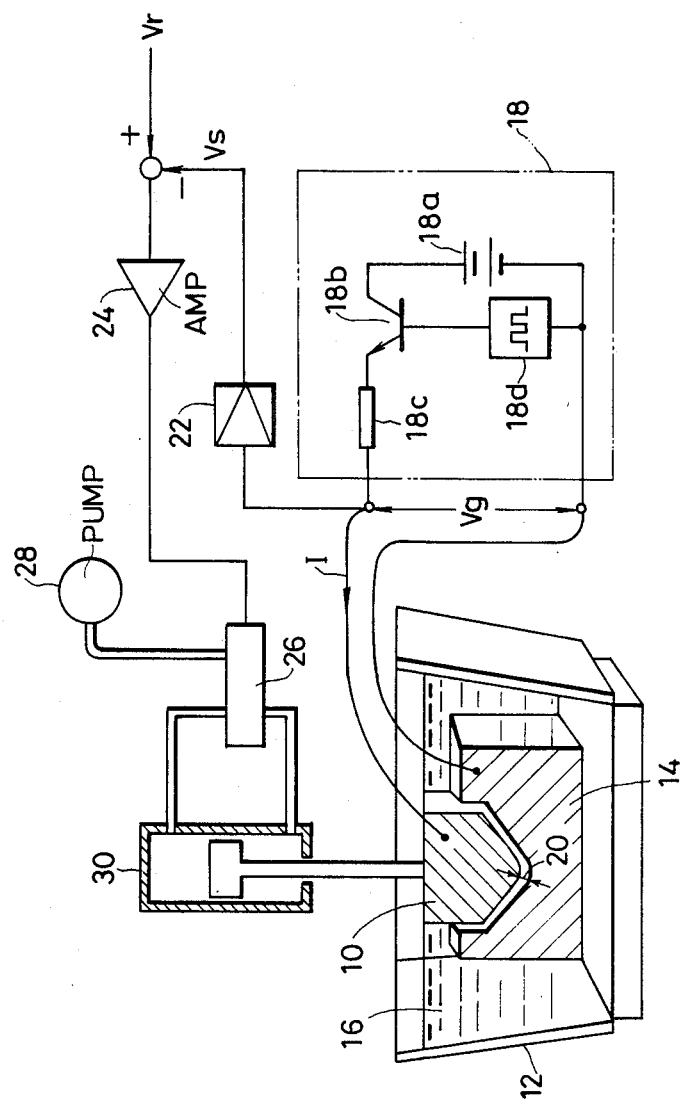
FIG. 1 is a diagram of a conventional electric discharge machine and its operational principle.
Figure 4:
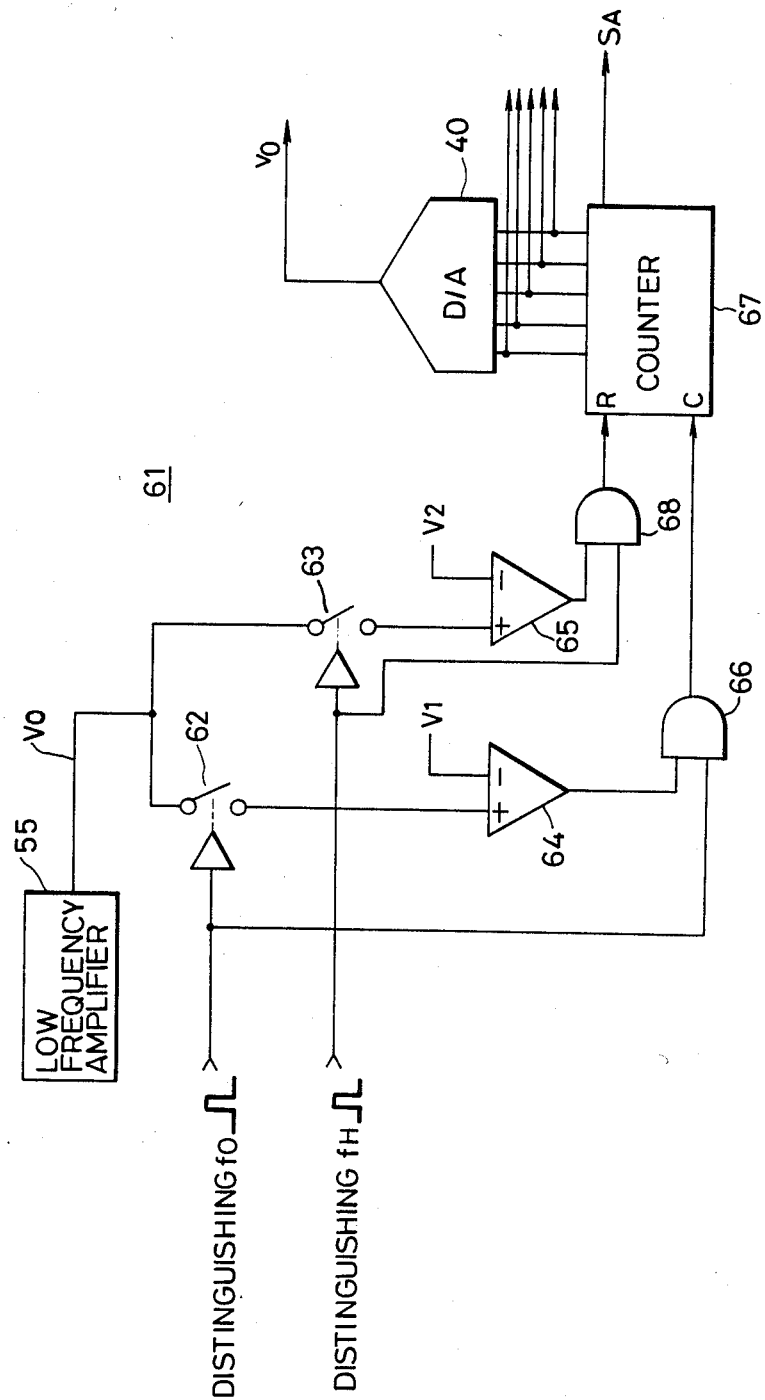
FIG. 4 is a circuit diagram of a device for detecting and distinguishing an abnormal condition.
Figure 9:
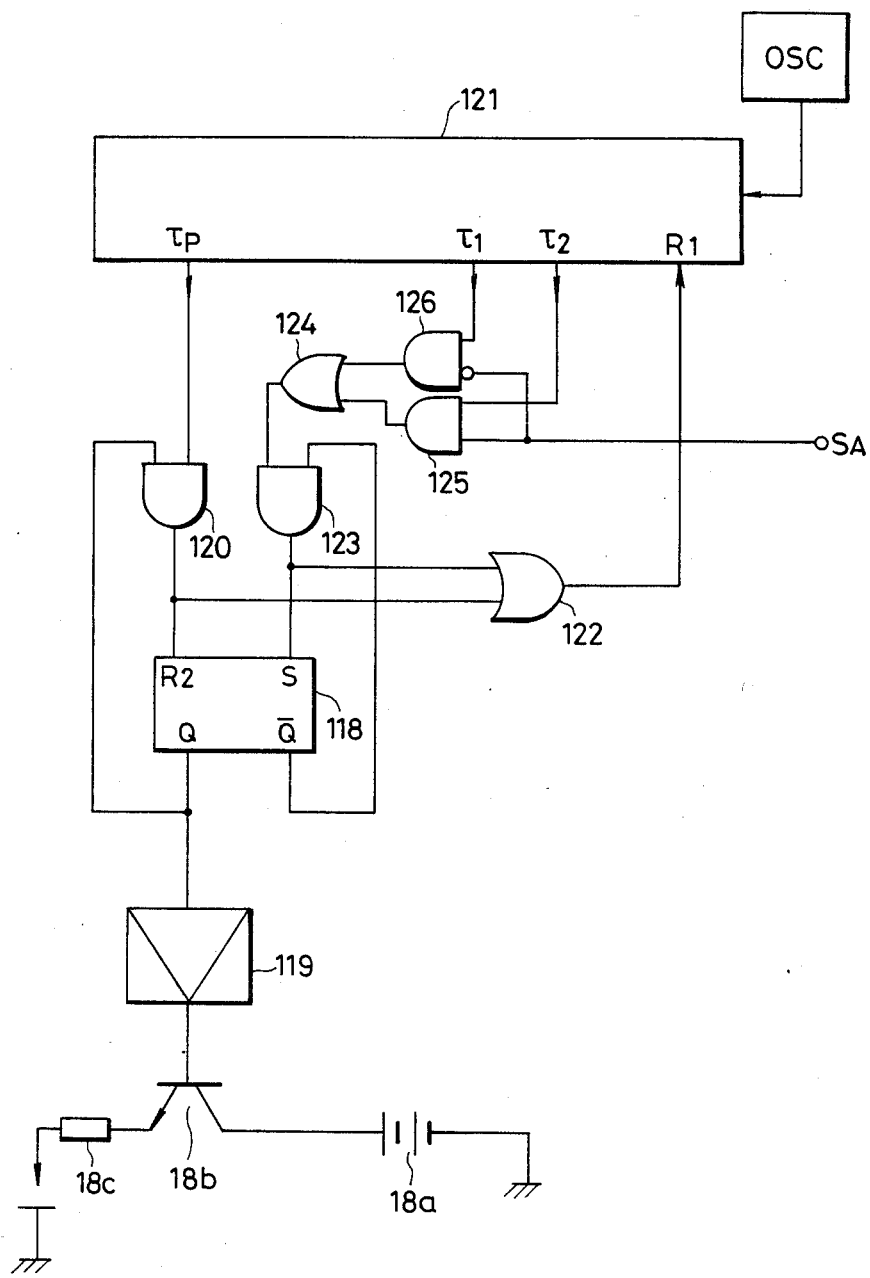
FIG. 9 is a diagram of a circuit for controlling the quiescent time of the voltage applied to the interpole gap.

By prolonging the OFF time of the switching element 18b (FIG. 1) based on the output obtained by the detection circuit in FIG. 4, the interval between electric discharges can be made longer so as to obtain a deionization effect and eliminate one of the factors causing electric discharge concentration. Referring to FIG. 9, a circuit and means for the above purpose will be described. An RS flip-flop 118 causes the switching element 18b to be turned ON through an amplifier 119 when its output Q is 1. In other words, the transistor has an ON time when Q=1 and OFF time when Q=0. Although the output of the AND gate 120 remains "0" until the ON time setting output $\tau p$ of the counter 121 for setting ON and OFF times becomes "1", Q then becomes "0" because the AND gate resets the flip-flop 118 as $\tau p$ becomes "1" and causes OFF time. Simultaneously at this time, the output of the AND gate 120 operates to reset an oscillator OSC and the counter 121 for time setting through the OR gate 122; and thus counting is again initiated. When Q=0 is justified, $\overline{Q}=1$ is also brought about, so that a Q output of 1 may not be obtained until the output of the OR gate 124 becomes "1". The OR gate 124 and AND gates 125, 126 operate to control the setting of the OFF time in two modes according to the signal SA, that is, to a value $\tau 1$ or to $\tau 2 > \tau 1$. In other words, according to the present invention, machining is carried out with off time $\tau 1$ during normal electric discharge and with a long off time $\tau 2$ during abnormal electric discharge, whereby when the electric discharge is deemed abnormal, deionization is effected by sharply prolonging the quiescent time to prevent electric discharge concentration and to suppress the generation of an abnormal arc. The abnormal electric discharge condition is quickly determined by utilizing the change in the frequency spectrum at the time of discharge.

Although two OFF times τ1, τ2 are referred to in the description above, the same effect can be made available by continuously setting the OFF time in accordance with the contents of the counter 67 detecting the number of concentrated electric discharges.

Figure 10:
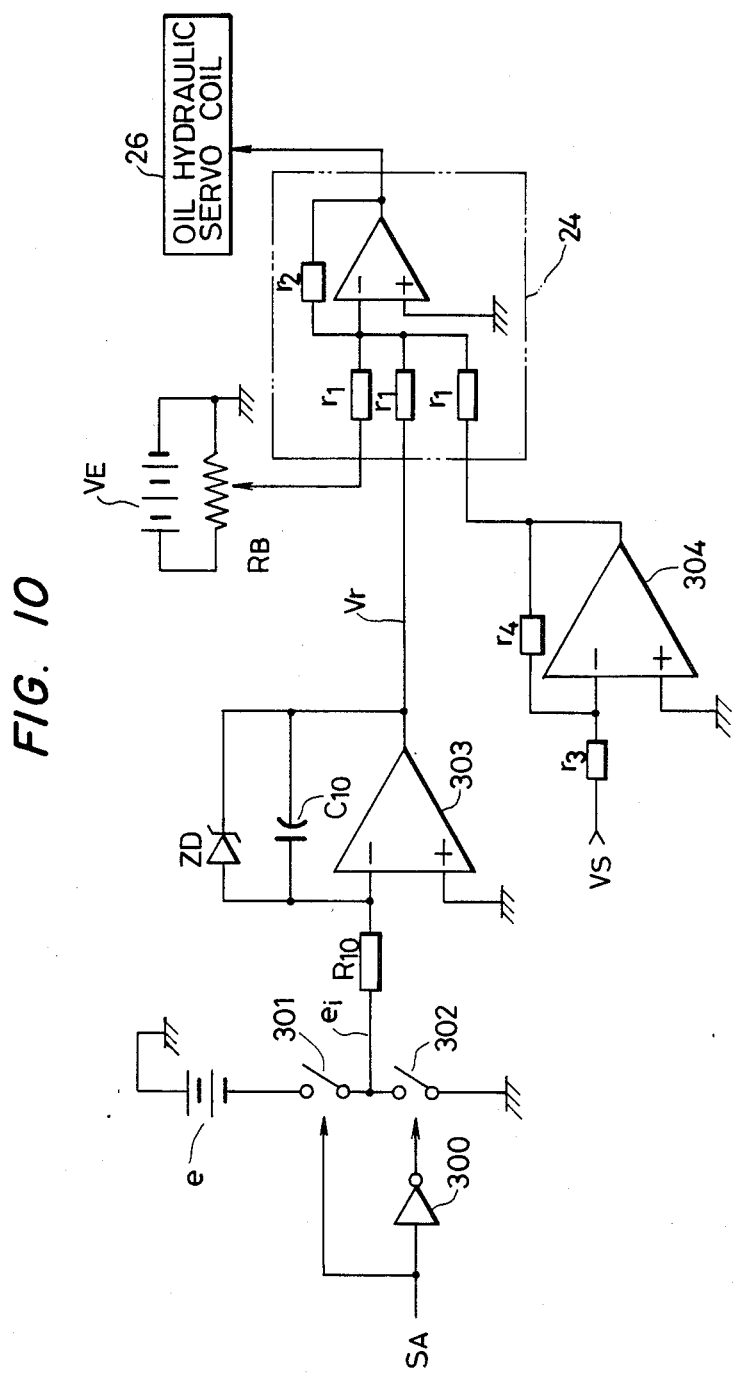
FIG. 10 is a diagram of a circuit for controlling the reference voltage for controlling the interpole gap.

By changing the interpole gap control, or the reference value $V_R$ of the interpole servo signal based on the output obtained from the detection circuit 61 (FIG. 4), the reference voltage may be made greater at the time of an abnormality, to increase the mean interpole gap voltage, and thus the length of the interpole gap is increased, that is, electric discharge may not readily occur while preventing electric discharge concentration. Referring to FIG. 10, an exemplary embodiment for implementing this method is described in detail.

Since the output of an inverter 300 is "0" when the detection signal SA given by the device shown in FIG. 3 is "1", or at the time of an abnormality, analog switches 301 and 302 are in ON and OFF states, respectively. Consequently, the input voltage of an integrating circuit comprising operational amplifier 303, resistor R10 and capacitor C10 becomes ei = −e, and the voltage Vr is expressed as follows:

$$Vr = V + e/R\omega \cdot C10 \, t$$

wherein V = initial value at t=0. Accordingly, as long as SA continues to be "1", the reference value Vr will keep increasing with an increase in time t and, because an amplifier 24 drives an oil hydraulic servocoil 26 and raises the electrode, Vs proportionally increases in the negative direction to an extent corresponding to the increase of Vr.

Subsequently, when SA is "0", or when electric discharge concentration is not present, both switches 301, 302 are in an OFF state, whereby the input voltage ei of the operational amplifier 303 becomes 0, so that the voltage stored in the integrating capacitor C10 is discharged. Consequently, the voltage Vr is decreased and the interpole gap is controlled so that it is increasingly narrowed while the frequency of electric discharge and machining speed are also increased. The resistor R10 and the capacitor C10 determine the time constant of integration, which should be a value on the order of roughly several tens of seconds; if the voltage Vr is controlled so that it is changed in a short period of time, the length of the interpole gap will be sharply changed resulting in inconveniences such as the hunting phenomenon and vibration of the electrode. The voltage value Vr is limited to the Zener voltage in the positive direction by a Zener diode ZD and to 0 in the negative direction. A power supply $V_E$ and a variable resistor $R_B$ are used to manually set a value, which assumes a central role in automatically controlling the interpole gap. An operational amplifier 304, and resistors r3, r4 perform as an inversion circuit and an attenuator for controlling the mean voltage Vs of the interpole gap by adding it to the voltage Vr.

Although the voltage Vr is made to change by integrating the detection signal SA in the above described example, the voltage Vr is much more minutely controllable by converting the digital data in the counter 67 into analog data through the primary delay circuit with a greater time constant.

As already referred to, the exemplary embodiment shown in FIG. 10 makes it possible to provide an electric discharge machine wherein a prescribed condition in the interpole gap is established by distinguishing between normal and abnormal conditions using frequency spectrum analysis and, to normalize the electric discharge condition, changing the reference value of the interpole gap servomechanism to reduce the frequency of the electric discharge by enlarging the size of the interpole gap at the time of an abnormality.

Figure 11:
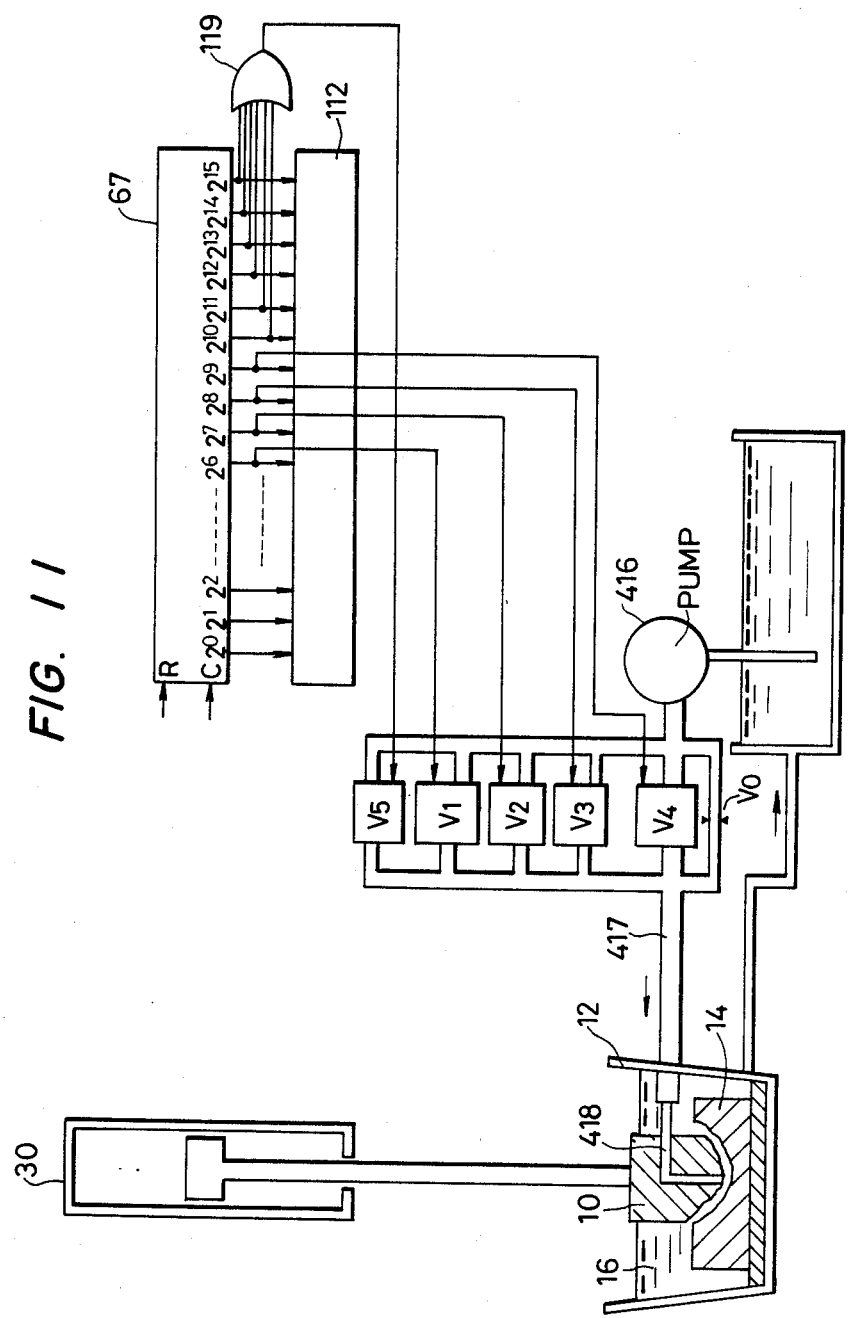
FIG. 11 is a diagram of a circuit for controlling the supply of working liquid.

On the other hand, if the supply of working liquid to the interpole gap is changed depending on the contents of the counter 67, a normal condition in the interpole gap may be resumed in this manner. FIG. 11 shows a control circuit for controlling the supply of the working liquid, wherein the output of a working liquid supply pump 416 is passed through a pipe 417 via variable displacement valves V1, V2, V3, V4, and then communicated with a jet channel 418 installed in the electrode 10, so that the quantity of flowing liquid can be changed according to the opening and shutting of the valves V1, V2, V3 and V4. The valves V1–V4 are controlled such that they are opened and closed by the outputs $2^6$-$2^9$ of the counter 67. In this example, V1, V2, V3 and V4 are arranged to supply working liquid at rates of 100 cc/min, 200 cc/min, 400 cc/min and 800 cc/min, respectively, so that a quantity of liquid corresponding to the quality of the condition in the interpole gap can be supplied. For instance, because the output of $2^6$ is "1" when the contents of the counter 67 indicate 64, V1 is opened and is used to supply 100 cc/min of working liquid, whereas V1 and V2 are opened and are used to supply 300 cc/min of liquid to the interpole gap when the outputs $2^6$ and $2^7$ are "1". When the counter content is too large, namely, more than 1024, a forced jet valve V5 is opened so as to supply as much as several thousand cc/min of working liquid. On the contrary, when the difference is small, a proper small quantity of liquid, which is employed for ordinary machining, is supplied to the interpole gap from a manually operated valve Vo.

As noted above, electric discharge in an abnormal condition is detected by analysing the frequency spectrum of the electric discharge waveform and controlled by the quantity of flowing working liquid in the example shown in FIG. 11. As a result, the sludge produced in the interpole gap is efficiently discharged, so that the efficiency of electric discharge can be considerably improved. In other words, since a discharge arc generated between the electrode and workpiece passes through sludge if the same exists in the interpole gap, a great deal of discharge energy is consumed by the sludge and the machining efficiency is reduced. However, according to this aspect of the invention, the impedance in the interpole gap is not increased more than necessary, and the electric discharge for use in machining is stabilized, because the discharge energy is prevented from being wasted, and the liquid flow is reduced when the interpole gap is narrowed so as to effectively increase the machining speed.

Although the quantity of the flowing working liquid is made variable in the above example, the purpose is to effectively remove sludge from the interpole gap, and it is also possible to control the liquid pressure in proportion to the contents of the counter in order to obtain the same effect.

What is claimed is:

1. In an electric discharge machine including an electrode and an electrically conductive workpiece installed opposite each other with an insulating working liquid filling the gap therebetween, and which is used to machine the workpiece by causing an electric discharge across the gap, the improvement comprising means for detecting the distribution of frequency components in an electrical signal in the interpole gap when electric discharge is caused between the electrode and the workpiece, means for comparing the distribution of frequency components detected by the detection means with a predetermined distribution of frequency components, and means for distinguishing the interpole gap condition and for applying a signal upon judging said condition based on an output signal of said comparator means, wherein said electrical signal comprises a pulse voltage having a predetermined period T, and said comparator means comprises means for comparing an output having a frequency $f_o$ equivalent to an inverse of said period T with a first reference output, and for comparing an output having a high frequency $F_H$, higher than said frequency $f_o$, with a second reference output.

2. An electric discharge machine as claimed in claim 1, wherein said comparator means comprises means for producing an output based on a judgement as to whether said frequency output $f_o$ is larger than a predetermined reference output value and whether the predetermined frequency output $f_H$ is present, whereas said means for distinguishing the interpole gap condition comprises means for judging the interpole gap to be in an abnormal condition on receiving a signal output by said comparator means based on the detection of said frequency output $f_o$ larger than said reference output value, and for judging the interpole gap to be in a normal condition on receiving a signal output by said comparator means based on the detection of the presence of said frequency output $f_H$.

3. An electric discharge machine as claimed in claim 1, said electric discharge machine being provided with means for controlling the interpole gap based on the output of said means for distinguishing said gap condition.

4. An electric discharge machine as claimed in claim 3, wherein said means for controlling the interpole gap comprises means for generating a signal for compulsorily enlarging the interpole gap when said means for distinguishing the gap condition outputs a signal signifying an abnormal condition.

5. An electric discharge machine as claimed in claim 4, wherein said means for controlling the interpole gap comprises means for lengthening a period of time during which said signal for compulsorily enlarging the interpole gap is generated in proportion to a period of time during which said signal signifying an abnormal condition is output by said means for distinguishing the abnormal condition in the interpole gap.

6. An electric discharge machine as claimed in claim 1, further comprising means for controlling the value of said electrical signal based on the output of said means for distinguishing the gap condition.

7. An electric discharge machine as claimed in claim 6, wherein said means for controlling said electrical signal comprises means for generating a signal for reducing the applied voltage upon receiving a signal signifying an abnormal condition output from said means for distinguishing the gap condition.

8. An electric discharge machine as claimed in claim 7, and further including a power supply connected across said electrode and said workpiece through a plurality of switching elements connected in parallel, said means for controlling the applied voltage comprising means for supplying a signal for reducing the voltage applied to one of said switching elements.

9. An electric discharge machine as claimed in claim 8, wherein said plurality of switching elements comprise transistors arranged such that an oscillator is connected to a base for controlling at least one of said transistors, and said means for controlling the applied voltage comprising means for controlling said oscillator.

10. An electric discharge machine as claimed in claim 1, wherein said electrical signal is a pulse-shaped voltage having a quiescent time, and wherein said electric discharge machine is provided with means for controlling said pulse voltage in a manner so as to change said quiescent time based on the output of said means for distinguishing the gap condition.

11. An electric discharge machine as claimed in claim 10, wherein said means for controlling said quiescent time comprises means for generating a signal for extending said quiescent time on receiving a signal signifying an abnormal condition output by said means for distinguishing the gap condition.

12. An electric discharge machine as claimed in claim 11, wherein said pulse voltage is generated by the setting and resetting of a flip flop, said flip flop being set and reset by an output of a counter, said means for controlling said quiescent time including a plurality of count setting values for variably controlling a period of time during which said flip flop operates inversely, in order to generate a subsequent pulse voltage.

13. An electric discharge machine as claimed in claim 1, and including means for machining said workpiece while controlling said interpole gap in proportion to the difference between a mean voltage and a reference voltage across said interpole gap, and further including means for controlling said reference voltage based on the output of said means for distinguishing the gap condition.

14. An electric discharge machine as claimed in claim 13, wherein said means for controlling the reference voltage comprises means for generating a signal for increasing said reference voltage on receiving a signal signifying an abnormal condition output by said means for distinguishing the gap condition.

15. An electric discharge machine as claimed in claim 14, wherein said means for controlling the reference voltage comprises means for gradually increasing said reference voltage as time elapses on receiving a signal signifying an abnormal condition output by said means for distinguishing the gap condition.

16. An electric discharge machine as claimed in claim 15, wherein said means for increasing said reference voltage gradually increases said reference voltage in such a manner as to prevent a sudden change in the interpole gap and the vibration of the electrode.

17. An electric discharge machine as claimed in claim 1, and further including means for controlling the supply of said insulating working liquid based on the output of said means for distinguishing the gap condition.

18. An electric discharge machine as claimed in claim 17, wherein said means for controlling the supply of working liquid comprises means for generating a signal for increasing the supply of the working liquid on receiving a signal signifying an abnormal condition output by said means for distinguishing the gap condition.

19. An electric discharge machine as claimed in claim 18, wherein said means for controlling the supply of working liquid comprises means for generating a signal for increasing the supply of working liquid in proportion to a signal signifying the magnitude of the abnormal condition output by said means for distinguishing the gap condition.

* * * * *